US012271833B2

(12) United States Patent
Helenius et al.

(10) Patent No.: US 12,271,833 B2
(45) Date of Patent: Apr. 8, 2025

(54) MULTI-MODEL BASED ACCOUNT/PRODUCT SEQUENCE RECOMMENDER

(71) Applicant: Palo Alto Networks, Inc., Santa Clara, CA (US)

(72) Inventors: Jere Armas Michael Helenius, Cupertino, CA (US); Nandan Gautam Thor, Mountain View, CA (US); Gorkem Kilic, Amsterdam (NL); Juho Pekanpoika Parviainen, Sunnyvale, CA (US); Erik Michael Bower, San Francisco, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 1683 days.

(21) Appl. No.: 16/371,107

(22) Filed: Mar. 31, 2019

(65) Prior Publication Data

US 2020/0311585 A1 Oct. 1, 2020

(51) Int. Cl.
*G06N 5/048* (2023.01)
*G06N 3/044* (2023.01)
(Continued)

(52) U.S. Cl.
CPC ............. *G06N 5/048* (2013.01); *G06N 3/044* (2023.01); *G06N 3/08* (2013.01); *G06Q 30/0202* (2013.01); *G06N 20/20* (2019.01)

(58) Field of Classification Search
CPC ........ G06N 5/048; G06N 3/0445; G06N 3/08; G06N 20/20; G06Q 30/0202
See application file for complete search history.

(56) References Cited

U.S. PATENT DOCUMENTS 7,403,904 B2  7/2008 Abe et al.
7,945,473 B2  5/2011 Fano et al.
(Continued)

FOREIGN PATENT DOCUMENTS

CN  108921624 A  11/2018
GB  2427043 A  12/2006

OTHER PUBLICATIONS

Paul E. Black, "greedy algorithm", in Dictionary of Algorithms and Data Structures [online], Paul E. Black, ed. Feb. 2, 2005. Available from: https://www.nist.gov/dads/HTML/greedyalgo.html.*
(Continued)

*Primary Examiner* — Michael J Huntley
*Assistant Examiner* — Adam C Standke
(74) *Attorney, Agent, or Firm* — Gilliam IP PLLC

(57) ABSTRACT

To automatically identify a sequence of recommended account/product pairs with highest likelihood of becoming a realized opportunity, an account/product sequence recommender uses an account propensity (AP) model and a reinforcement learning (RL) model and target engagement sequence generators trained on historical time series data, firmographic data, and product data. The trained AP model assigns propensity values to each product corresponding to received account characteristics. The trained RL model generates an optimal sequence of products that maximizes the reward over future realized opportunities. The target engagement sequence generators create target engagement sequences corresponding to the optimal sequence of products. The recommender prunes the optimal sequence of products based on the propensity values from the trained AP model, the completeness of these target engagement sequences, and a desired product sequence length. The recommender uses the remaining products, validated on three models, for account/product recommendations.

20 Claims, 9 Drawing Sheets

(51) Int. Cl.
*G06N 3/08* (2023.01)
*G06N 20/20* (2019.01)
*G06Q 30/0202* (2023.01)

(56) References Cited

U.S. PATENT DOCUMENTS

| | | | | |
|---|---|---|---|---|
| 11,017,038 B2* | 5/2021 | Botea | ................... | H04L 67/306 |
| 2002/0138285 A1 | 9/2002 | Decotiis et al. | | |
| 2007/0112615 A1 | 5/2007 | Maga et al. | | |
| 2017/0255945 A1* | 9/2017 | McCord | ................. | G06N 20/00 |
| 2020/0065863 A1* | 2/2020 | Hong | ..................... | G06N 5/04 |

OTHER PUBLICATIONS

Mirylenka, Katsiaryna et al. "Recurrent neural networks for modeling company-product time series." Proceedings of AALTD (Year: 2016).*

Jiao, Jianxin et al. "Product portfolio identification based on association rule mining." Computer-Aided Design 37.2 (Year: 2005).*

Dogan, Ibrahim, and Ali R. Güner. "A reinforcement learning approach to competitive ordering and pricing problem." Expert Systems 32.1 (Year: 2015).*

Chandra, et al., "Evolutionary Training of Hybrid Systems of Recurrent Neural Networks and Hidden Markov Models", International Journal of Applied Mathematics and Computer Sciences vol. 3 No. 3, 2006, 6 pages.

Krakovna, et al., "Increasing the Interpretability of Recurrent Neural Networks Using Hidden Markov Models", 2016 CML Workshop on Human Interpretability in Machine Learning (WHI 2016), New York, NY, USA., Sep. 30, 2016, 5 pages.

Lang, et al., "Understanding Consumer Behavior with Recurrent Neural Networks", Proceedings of the International Workshop on Machine Learning Methods for Recommender Systems. 2017., 8 pages.

Wessels, et al., "Refining Hidden Markov Models with Recurrent Neural Networks", Proceedings of the IEEE-INNS-ENNS International Joint Conference on Neural Networks. IJCNN 2000. Neural Computing: New Challenges and Perspectives for the New Millennium, Jul. 27, 2000, 6 pages.

* cited by examiner

MULTI-MODEL BASED ACCOUNT/PRODUCT SEQUENCE RECOMMENDER

BACKGROUND

The disclosure generally relates to the field of data processing, and more particularly to artificial intelligence.

In many applications, a classification method is needed to determine the likelihood of a user making a yes/no (binary) decision based on a set of user features. One popular model for binary classification is random forest classification. This model employs the technique of bootstrap aggregation, wherein the output of a model is the average of independently trained sub-model outputs. For random forest models, the sub-model is a random decision tree. The random decision trees partition the user feature space based on a set of binary decisions (for example, is a user over or under 50 years old) corresponding to each branch. The leaves of the random decision tree (which are regions of the user feature space) correspond to probabilities that the user chooses yes. For a user query, the random forest will run many decision trees on the user's features to get a set of probabilities, one for each tree. The random forest then averages these probabilities to get a final probability the user will choose yes. The averaging operation over several sub-models makes the random forest model more robust to outlier noise in the data and reduces the effects of over-fitting common in random decision trees.

Reinforcement learning is a general framework for determining a sequence of actions taken by an agent based on an environment and a cumulative reward function. The approach differs from that of a greedy algorithm in that the reward function depends on both current and future states of the agent, hence at every step the agent must have a running prediction of rewards at every future state. Future rewards are discounted by a factor $\gamma$ between 0 and 1, where $\gamma=1$ indicates future rewards are not discounted (this choice often leads an infinite valued cumulative reward) and $\gamma=0$ corresponds to a greedy algorithm. This cumulative reward function at each state is called a Q function. The goal of reinforcement learning algorithms is to learn a policy, where a policy is a map that assigns a Q function value to each state/action pair. This Q function value will determine the likelihood of the agent to take a given action from a given state. Q-learning is an algorithm for learning a policy that learns progressively better guesses (probabilities) for what action to take at every state by simulating the actions of many agents through each state, one after the other, and observing a cumulative reward function at each state.

BRIEF DESCRIPTION OF THE DRAWINGS

Embodiments of the disclosure may be better understood by referencing the accompanying drawings.

DESCRIPTION

Figure 1:
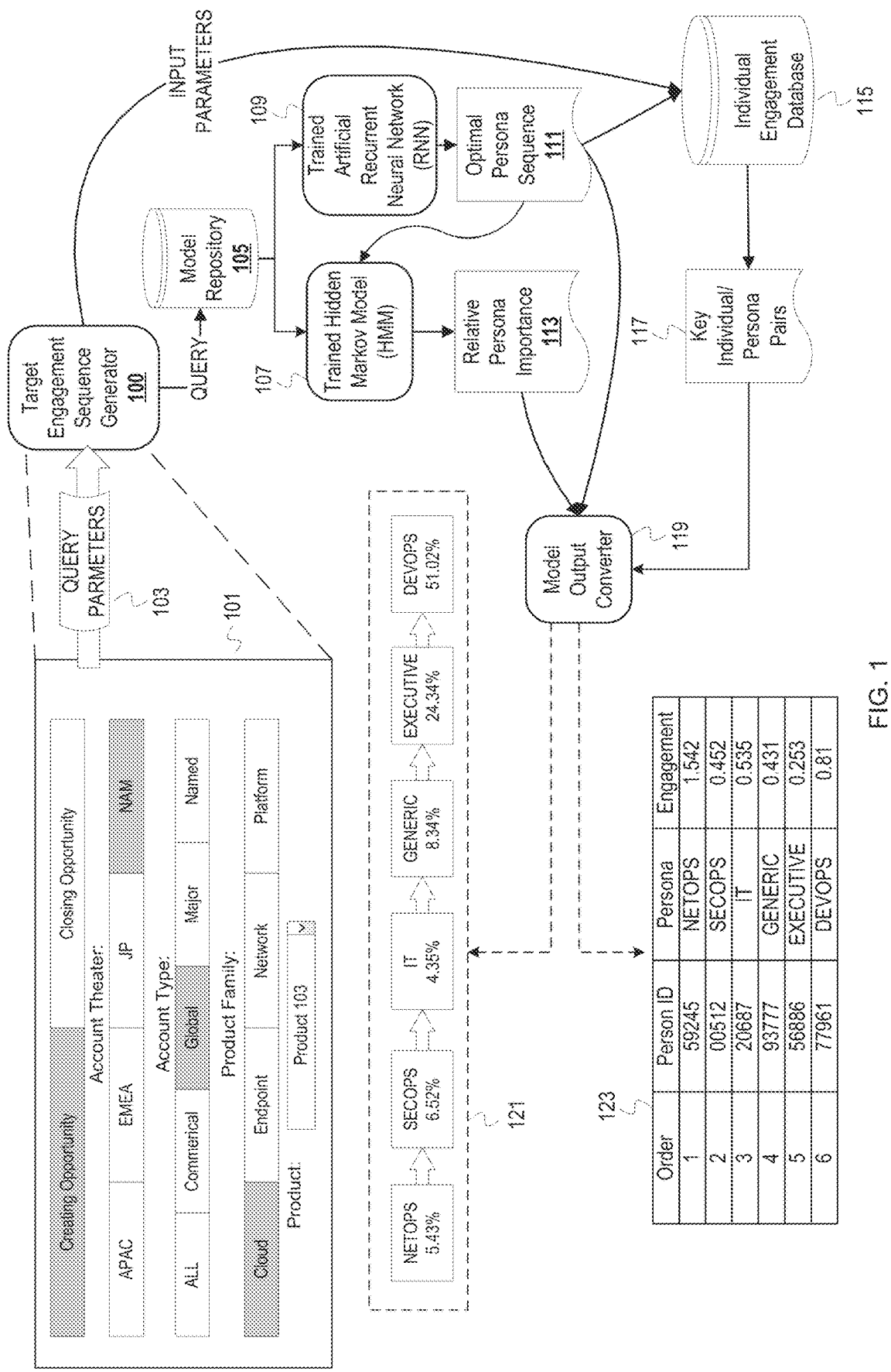
FIG. 1 is a conceptual diagram of a target engagement sequence generator responding to a create or close opportunity query specific to specified opportunity characteristics.

The description that follows includes example systems, methods, techniques, and program flows that embody embodiments of the disclosure. However, it is understood that this disclosure may be practiced without these specific details. For instance, this disclosure refers to a random forest model in illustrative examples. Aspects of this disclosure can be instead applied to logistic regression models or gradient boosting regression models. In other instances, well-known instruction instances, protocols, structures and techniques have not been shown in detail in order not to obfuscate the description.

Overview

To determine which opportunities for account/product pairs have a high likelihood of a winning outcome, account/product pairs unlikely to become realized opportunities are filtered out. This determination involves a running knowledge of features for each account that would inform likelihood that the account would buy specific products, which can be infeasible for an individual managing many accounts.

An application can be developed to automatically identify a subset of account/product pairs and target engagement sequences of individuals for each account/product pair that maximizes the likelihood of a winning outcome. To identify account/product pairs likely to have a winning outcome, a propensity model of accounts ("account propensity model") and a reinforcement learning model are used along with trained models to identify optimal sequence of individuals to contact for the identified account/product pairs. The account propensity model, trained on firmographic, historical interaction, and product data, predicts the likelihood a specified account will buy a product. The account propensity model uses random forest classification on a feature space for the product, where the feature space comprises measurable product properties from the aggregated firmographic, historical interaction, and product data. The reinforcement learning model determines the order that products should be sold to the account to maximize combined winning outcomes over the sales. This reinforcement learning model trains its' policy using Q-learning on historical product paths for the account. The second model outputs a product path for the account. These two models are trained for each account and stored in a model repository.

To generate account/product pair recommendations, an account is either queried by a user or associated with a user to whom the account is already assigned. An account identifier is sent to the model repository, which returns the reinforcement learning model and the account propensity model corresponding to the identified account. The reinforcement learning model generates an optimal product path. The account propensity model outputs a propensity for each product in association with the account. Finally, the model repository returns target engagement sequence generators for each account/product pair corresponding to the optimal product path. The outputs of these models are used to prune account/product pairs. The remaining account/product pair recommendations thus ensure a high likelihood of a winning outcome and are validated by several models simultaneously.

Example Illustrations Related to Target Engagement Sequence Generators

In the following example illustrations, FIGS. 1-4 describe target engagement sequence generators. In many situations where a client/account pair is given, a sequence of individuals may be contacted in order to create or close an opportunity. The sequence of individuals involved in creating or closing an opportunity may be happenstance or may be a result of a careful strategy. Careful strategies may be constructed to choose a sequence of individuals that maximizes the chance at a desired outcome from creating or closing an opportunity (e.g., selling a product or service). These strategies typically require many hours of human labor and expertise specific to the opportunity. Moreover, these strategies are usually designed around personas, which may be a class of individuals within an organization defined by a title or role. A combination of models has been developed to identify a sequence of individuals with a highest likelihood of realizing an opportunity, whether creating or closing an opportunity, without the expense of substantial time and specialized human labor/expertise.

This designed application or service ("target engagement sequence generator") uses a combination of models that are trained with historical opportunity data (e.g., e-mail data, sales data, contract data, etc.) and instantiated for different combinations of opportunity characteristics values. The target engagement sequence generator selects a particular instance of a trained model pair to generate an optimal sequence of individuals to target to realize an opportunity defined by query parameters. To train the models, historical time series data from creating and closing opportunities with winning and losing outcomes are used. The data from opportunities are transformed into inputs for models that collectively inform how to choose the sequence of individuals with a highest likelihood to realize the opportunity. Initially, the historical time series data is fed into two regression models. The first regression model determines weights for each historical time series datum that is added as a feature to the historical time series data. The second regression model, based on weighted historical time series data from the first regression model, determines an engagement value for each individual encountered in the historical time series data. This second regression model enables segmentation of a persona, i.e. identifying within a persona a specific individual(s) that maximizes likelihood of realizing the opportunity. The identified individual(s) per persona are stored in an individual engagement database. The weighted historical time series data is then grouped by every combination of opportunity characteristics and sent to two different models for training. The first model is an artificial recurrent neural network (RNN) that receives historical sequences of personas and predicts the optimal sequence of personas to interact with for an opportunity. The second model is a hidden Markov model (HMM) that also receives the historical sequence of personas, and further incorporates the values of the outcomes of those sequences to predict the relative importance of each persona to the opportunity. Once trained, the models are stored in a model repository.

To identify a target engagement sequence with the highest likelihood of realizing an opportunity, the target engagement sequence generator uses the trained models based on opportunity characteristics. The target engagement sequence generator queries the model repository based on characteristics of an opportunity to retrieve a trained RNN and a trained HMM. The trained RNN identifies a sequence of personas, which can be combined with the engagement values retrieved from the individual engagement database to identify a sequence of individuals. The HMM identifies the importance of each individual in the sequence, which informs how to efficiently allocate resources to each individual interaction. These models can be efficiently applied to any incoming opportunity, enabling the individual-level segmentation of high likelihood interaction sequences at scale.

FIG. 1 is a conceptual diagram of a target engagement sequence generator responding to a create or close opportunity query specific to specified opportunity characteristics. A target engagement sequence generator 100 receives query parameters 103 from a graphical user interface (GUI) 101, which may be a component of the target engagement sequence generator 100 or a separate program that passes the query parameters 103 via inter-process communication. The target engagement sequence generator 100 retrieves from a model repository 105 a trained artificial recurrent neural network (RNN) 107 and a trained hidden Markov model (HMM) 109 based on the query parameters 103. Based on input parameters from the query parameters 103, the RNN 107 and HMM 109 respectively output an optimal persona sequence 111 and a relative persona importance 113. The target engagement sequence generator 100 also interacts with an individual engagement database 115 based on the optimal persona sequence 111 to obtain key individual/persona pairs 117. A model output converter 119 combines outputs 111, 113, and 117. A persona sequence 121 with quantified importance is an example of a possible output of the model output converter 119 after combining the optimal persona sequence 111 and relative persona importance 113. Individual sequence and engagement table 123 is another possible output of model output converter 119, after combining the optimal persona sequence 111 with the key individual/persona pairs 117.

FIG. 1 depicts the GUI 101 that presents options for choosing values for opportunity characteristics for a selected opportunity type. In this illustration, the GUI 101 presents opportunity types of creating an opportunity and closing an opportunity. The GUI 101 also presents for selection values or options for several opportunity characteristics, including the account theater, the account type, the product family, and the product. Upon detection of a submit event (e.g., activation of a submit button that is not depicted), the GUI 101 communicates the selected opportunity characteristics values as the query parameters 103 to the target engagement sequence generator 100. The query parameters 103 determine the choice of trained RNN 107 and trained HMM 109 from the repository of models 105, according to the combination opportunity characteristics values which can include the account theater, account type, and product.

The target engagement sequence generator 100 invokes the trained RNN 107 to obtain the optimal persona sequence 111. The trained RNN 107 can generate a seed for initial input and receive the seed as input, then iteratively feed the resulting output as input to generate a sequence of personas. For example, a seed can be chosen uniformly at random among all first personas from sequences of personas in previously seen won opportunities for the combination of opportunity characteristics. The optimal persona sequence 111 comprises the output sequence of personas once a predetermined sequence length or end state has been reached.

The target engagement sequence generator 100 also invokes the trained HMM 109 with the optimal persona sequence 111 as input. The trained HMM 109 comprises hidden states and output states, as well as pretrained transition probabilities between hidden states and output probabilities between hidden states and output states. In this model, the hidden states represent personas and the output states represent the sale amount at the end of a sequence of personas. Thus, the output probability between a persona and sale amount represents the likelihood that persona generates that sale amount. The trained HMM 109 generates the relative persona importance 113 by computing the expected output (sale amount) of each hidden state (persona) using the output probabilities. For a given persona, this can be computed as the inner product of a vector of output probabilities from a hidden state representing the given persona and a vector of output states. The computation yields an expected sale amount, or "importance," corresponding to the given persona. An importance value is computed for each persona in this way. The importance values can be rescaled so that the sum over every importance value is equal to 100 (i.e. percentages). The relative persona importance 113 comprises a set of personas and the importance value of each persona.

The target engagement sequence generator 100 accesses the individual engagement database 115 based on the opportunity characteristics indicated in the query parameters 103 and based on the optimal persona sequence 111. Individual engagement database 115 stores the engagement of individuals as well as additional metadata for each individual. The engagement of each individual can be precomputed using a regression model on historical time series interaction data. The key individual/persona pairs 117 comprises the individual/persona pairs as well as the engagement value of the corresponding individuals identified as "key" with the regression models during a training phase of the target engagement sequence generator 100. The key individual/persona pairs 117 may also include metadata about each individual.

Model output converter 119 receives optimal persona sequence 111, relative persona importance 113, and key individual/persona pairs 117. Model output converter 119, for each persona in optimal persona sequence 111, retrieves the corresponding relative persona importance 113 and concatenates them to generate output 121. Each persona has the importance value from relative persona importance 113 displayed below it as a percentage, and the personas are ordered from left to right in order of optimal persona sequence. In the given example, the optimal first persona in order to create an opportunity is NETOPS and the corresponding importance value of this persona is 5.43%.

Model output converter 119, for each persona in optimal persona sequence 111, retrieves the key individual in that persona as well as metadata for that individual from the key individual/persona pairs 117, and concatenates the persona sequence and corresponding individual metadata for output 123. Table 123 depicts 4 columns: the order, person id, persona, and engagement. The order ranges from 1 to 6 and represents the order with which to interact with individuals to maximize the likelihood of realizing the opportunity. The person id column specifies an identifier for each individual in the sequence. The persona column specifies the persona that each individual belongs to, and the engagement column is the metric received from the individual engagement database 115 for each individual. In some embodiments, table 123 can have additional metadata for each individual, including a contact name, email, title, etc.

Figure 2:
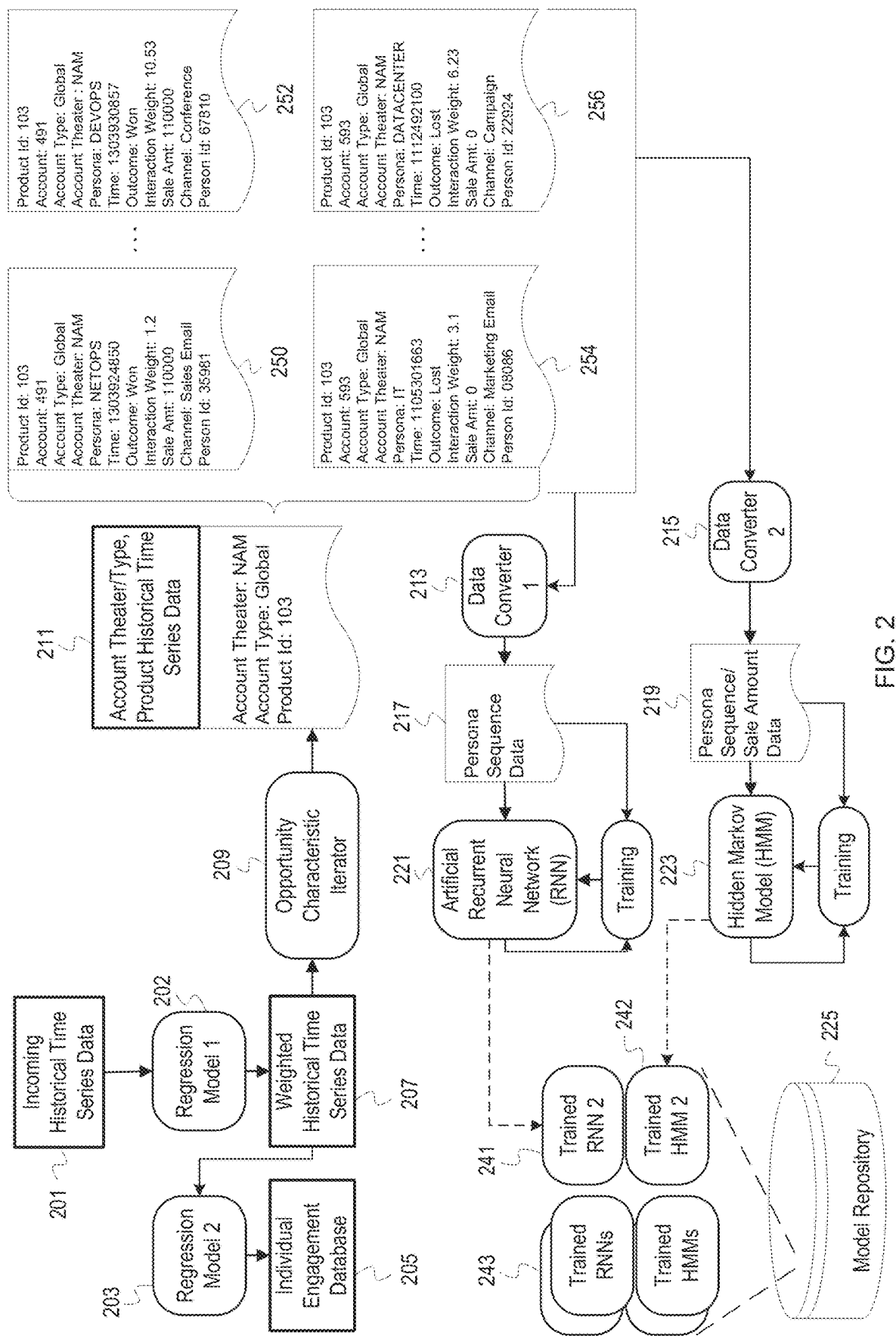
FIG. 2 depicts training for a target engagement sequence generator.

FIG. 2 depicts training for a target engagement sequence generator. Regression model 1 202 receives incoming historical time series data 201 comprising individual interactions in closing and creating opportunities with winning and losing outcomes. Regression model 1 202 outputs weights for each historical time series datum corresponding to an individual interaction, which is added to each datum as an attribute in a weighted historical time series data 207. Regression model 2 203 receives the weighted historical time series data 207 and outputs an engagement value for each individual based on the impact of the individual on winning outcomes in historical opportunities, which is fed into an individual engagement database 205. An opportunity characteristic iterator 209 iterates through every combination of opportunity characteristics and collects weighted historical time series data for each combination from the weighted historical time series data 207. One example of a combination of opportunity characteristics is given by account theater/type, product historical time series data 211. The opportunity characteristic iterator 209 sends a set of data 250, 252, 254, 256 specific to the combination of opportunity characteristics to data converter 1 213 and data converter 2 215. Data converter 1 213 transforms the data 250, 252, 254, 256 into persona sequence data 217 that is used to train an RNN 221. Data converter 2 215 transforms the data 250, 252, 254, 256 into persona sequence/sale amount data 219 that is used to train a HMM 223. Model repository 225 receives the trained RNN 221 and trained HMM 223 for future access. Model Repository 225 contains trained RNNs and trained HMMs 243 that have been trained on other combinations of opportunity characteristics from opportunity characteristic iterator 209.

The regression model 1 202 can split incoming historical time series data 201 into independent and dependent parts, where independent data comprises the sale amount attribute of each datum, and dependent data comprises every other attribute of each datum. The regression model 1 202 stores dependent data as rows in a "design" matrix and stores independent data as a "target" column vector where the nth entry of the column vector is the corresponding datum to the nth row of the matrix. The regression model 2 203 can split the weighted historical time series data 207 into independent data and weighted dependent data, where the weighted dependent data has an additional weight attribute. The regression model 2 203 can store the weighted dependent data as a weighted design matrix and the independent data as a target vector.

Regression model 1 202 and regression model 2 203 can perform various forms of regression analysis on the design/weight design matrix and column vector to determine, respectively, a weight for each time series historical datum, and an engagement value for each set of historical time series data corresponding to an individual. Individual engagement database 205 comprises the engagement values for each individual from regression model 2 203 as well as metadata associated with each individual. The choice of the above regression models can depend on the size and statistics of the historical time series data, and the allotted maximal training time. When determining weights for historical time series data, the regression model 1 202 and the regression model 2 203 can have unknown parameters corresponding to each historical time series datum. In some embodiments when training time is limited, the unknown parameters for regression model 1 202 can correspond to possible values of the channel attribute. In other embodiments when training time is limited, the unknown parameters for regression model 2 203 can correspond to possible values of the person id attribute.

Weighted historical time series data 207 comprises the incoming historical time series data 201 with an added weight attribute computed by regression model 2 203. Opportunity characteristic iterator 209 receives the weighted historical time series data 207 and groups it by every combination of opportunity characteristics. Within each combination, the data can be further grouped by account, and sorted by time. In the example depicted, the opportunity characteristics are an account theater/type and product. The account theater/type and product historical time series data 211 corresponds to the combination of account theater North America ("NAM"), account type "global," and product id "103." Example data corresponding to this combination is depicted in data 250, 252, 254, 256. Data 250, 252 correspond to one historical interaction sequence in the prescribed account theater, account type, and product id, and data 254, 256 correspond to a different historical interaction sequence in the same account theater/type and product id. Data 250, 252 have the same product id, account, account, account theater, outcome, and sale amount data attributes, and different persona, time, interaction weight, channel, and person id data attributes. Data 250, 252 have the same product id, account type, and account theater attributes as data 254, 256. Data 254, 256 have the same product id, account, account, account theater, outcome, and sale amount data attributes, and different persona, time, interaction weight, channel, and person id data attributes.

At each iteration of the opportunity characteristic iterator 209, data converter 1 213 receives account theater/type, product historical time series data 211 and outputs persona sequence data 217 that can be fed into the RNN 221. Data converter 1 213 can prune the product id, account type, account theater, time, sale amount, channel, and personal id data attributes and keep the persona, outcome, and interaction weight data attributes. Categorical data attributes persona and outcome can be converted into numerical values. The numerical values can be normalized by mean and variance of each data attribute to have mean zero and variance one. In another embodiment, the numerical values can be normalized to be greater than zero and less than one. The type of normalization can depend on the architecture of the network and the statistics of the incoming time series data. The resulting numerical data can be split into training and test data. Persona sequence data 217 comprises the transformed numerical data.

The RNN 221 splits persona sequence data 217 into training and test data. In a first epoch, the RNN 221 trains on a portion of the training data until convergence or a maximal number of time steps is reached. The RNN 221 can be validated on the test data. If the validation error on the test data lies below a desired threshold, training can be terminated. Otherwise, the RNN 221 can continue to receive training data, train until convergence or a maximal number of time steps, then test for validation error. This process continues until a desired number of epochs is reached. An artificial recurrent neural network can have internal units that are long short-term memory units or gated recurrent units. The number and type of units can depend on the statistics of the incoming persona sequence data as well as the desired precision and training time of the artificial recurrent neural network.

For each iteration of the opportunity characteristic iterator 209, the data converter 2 215 receives account theater/type, product historical time series data 211 and outputs persona sequence/sale amount data 219 that can be fed into the HMM 223. The data converter 2 215 prunes the account theater/type, product historical time series data 211 such that only the persona, and sale amount data attributes remain.

The HMM 223 receives persona sequence/sale amount data 219. The HMM 223 is initialized with randomized internal parameters comprising transition and output probabilities. The hidden states of the HMM 223 correspond to a list of personas represented in the persona sequence/sale amount data 219. The output states correspond to possible sale amounts for each persona sequence. The transition and output probabilities are estimated using the persona sequence/sale amount data 219. HMM 223 trains on persona sequence/sale amount data 219 until convergence or a maximal time threshold is reached.

After training, a trained RNN 2 241 and a trained HMM 2 242 are stored into the model repository 225. These are stored along with other trained RNNs and HMMs 243 in the model repository 225. The training component of the target engagement sequence generator stores trained models into the model repository based on the combination of opportunity characteristics for which the models were trained. For instance, the trained RNN 2 241 and the trained HMM 2 242 can be tagged with key words that identify a specific product and account for which the training data was selected. When historical time series data for the combination of opportunity characteristics has been previously seen, the RNN 221 and HMM 223 can be previously trained models from model repository 225. In this case, the personal sequence data 217 and persona sequence/sale amount data 219 is, respectively, used to update RNN 221 and HMM 223 with additional training data. The updated trained RNN 2 241 and trained HMM 2 242 are then reinserted into model repository 225.

Figure 3:
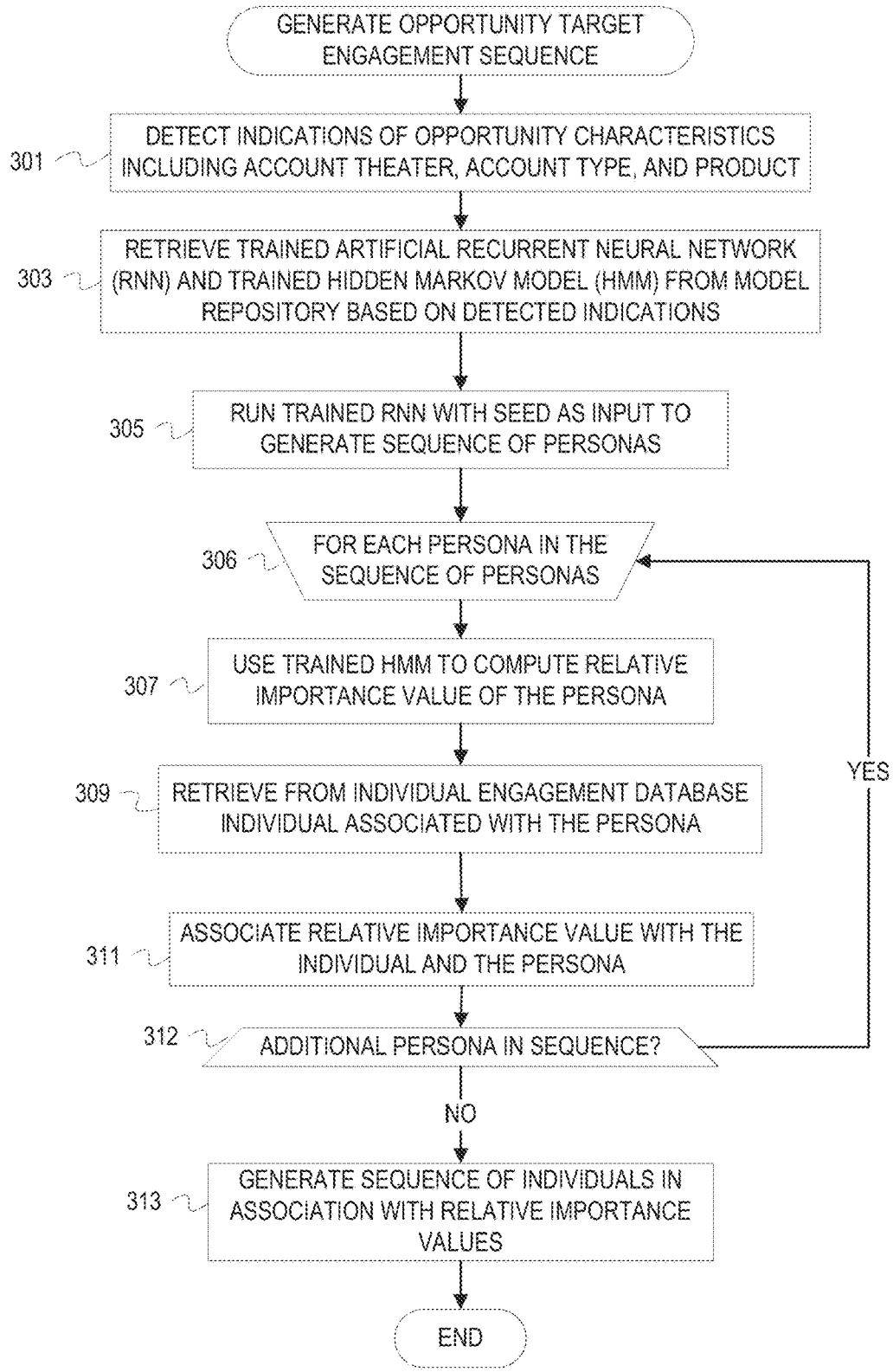
FIG. 3 is a flowchart of example operations for generating an opportunity target engagement sequence based on a trained HMM and trained RNN.

FIG. 3 is a flowchart of example operations for generating an opportunity target engagement sequence based on a trained HMM and trained RNN. The description of FIG. 3 refers to a target engagement sequence generator as performing the example operations for consistency with the earlier description. Naming or labeling of programs can be arbitrary, as well as modular organization of a program.

At block 301, the target engagement sequence generator detects indications of opportunity characteristics. Examples of opportunity characteristics include an opportunity type, an account theater, an account type, and a product. The target engagement sequence generator can detect values for or indications of opportunity characteristics using a variety of mechanisms, examples of which include via graphical user interface, receipt of a server query, based on monitoring a product database, etc. For different fields of opportunities, different opportunity characteristics can be received. For example, if the opportunity target engagement sequence is a sequence of people to contact in a hiring process, the opportunity characteristics could include a company size or a job title.

At block 303, the target engagement sequence generator retrieves a trained RNN and a trained HMM from a model repository based on the detected indications of opportunity characteristics. The target engagement sequence generator queries or searches the model repository with the detected opportunity characteristics indications. The model repository searches for models indexed by or tagged with the combination of opportunity characteristics indications in the query. Embodiments may split this into separate queries for the different models: a first query for a trained RNN that was trained for the indicated opportunity characteristics, and a second query for a trained HMM that was trained for the indicated opportunity characteristics. The trained RNN and trained HMM are previously trained on historical time series data corresponding to the detected opportunity characteristics.

At block 305, the target engagement sequence generator runs the trained RNN to generate a sequence of personas that would be optimal for realizing an opportunity with the indicated opportunity characteristics. The target engagement sequence generator can invoke a method or function that runs the trained RNN. In response to invocation, the trained RNN creates a seed as input and iteratively feeds output to itself as input to generate the sequence of personas for the indicated opportunity characteristics.

At block 306, the target engagement sequence generator begins iterating over the sequence of personas generated by the trained RNN and using the trained HMM. The target engagement sequence generator may invoke the trained HMM for each persona in the persona sequence or pass in the sequence of personas as an argument that the trained HMM iterates overs. This example uses operations that would invoke the trained HMM for each persona to help illustrate use of the trained HMM. The loop of operations includes the example operations depicted in blocks 307, 309, 311.

At block 307, the target engagement sequence generator invokes the trained HMM with an argument that is a persona j from the sequence of personas generated by the trained RNN. The trained HMM has a hidden state $x_j$ representing persona j and a corresponding set of output probabilities $o_{ij}$ for i=1 . . . T to output states with values $y_i$. The trained HMM computes the relative importance value for persona j as $\Sigma_{i=1}^T o_{ij}y_i$, where T is the total number of output states. Since the output probabilities $o_{ij}$ form a probability distribution when j is fixed, the importance value is an expectation under this probability distribution of the value of the output state $y_i$. In other words, the relative importance is the expected output value of persona j.

It may be noted that the trained HMM and the trained RNN can both be used to model sequences. However, because of the Markov property, the trained HMM does not have a memory of more than the current state in a sequence when it models transition probabilities between personas. Hence, a model that can track long term properties of sequences such as an RNN is preferred. As such, the transition probabilities between hidden states of the trained HMM are not used in the currently described embodiments.

At block 309, the target engagement sequence generator retrieves from an individual engagement database an individual (i.e., identifier of an individual) based on persona j. The target engagement sequence generator submits the persona j as a query to the individual engagement database. The individual engagement database can lookup persona j and retrieve metadata for a key individual within that persona. For example, the persona j may be an organization title/role or a business unit and the key individual would be an individual with the title/role or within the business unit. The key individual in persona j or matching persona j has been previously determined during analysis of the historical time-series data with the regression models.

If there is insufficient historical data for the given persona and detected opportunity characteristics, the individual engagement database can output a null value for the lookup. As a result, the individual metadata can be left blank. This case is typically an indication that the models are possibly unreliable because of lack of data corresponding to the combination of opportunity characteristics. These factors can be indicated to facilitate consideration when evaluating the quality of the generated opportunity target engagement sequence.

At block 311, the target engagement sequence generator associates the relative importance value output by the trained HMM with the key individual identifier from the individual engagement database and with the persona j. The target sequence generator can maintain a data structure to store the associations as they are obtained for each persona.

At block 312, the target engagement sequence generator determines whether there is an additional persona in the sequence to process. If there is an additional persona to process with the trained HMM, then control returns to block 306. Otherwise, control continues to block 313.

At block 313, the target engagement sequence generator generates a sequence of individuals in association with the relative importance values output by the trained HMM. The target engagement sequence generator can be programmed to also preserve the association of personas with the relative importance values and individual identifiers depending upon desired display output.

Figure 4:
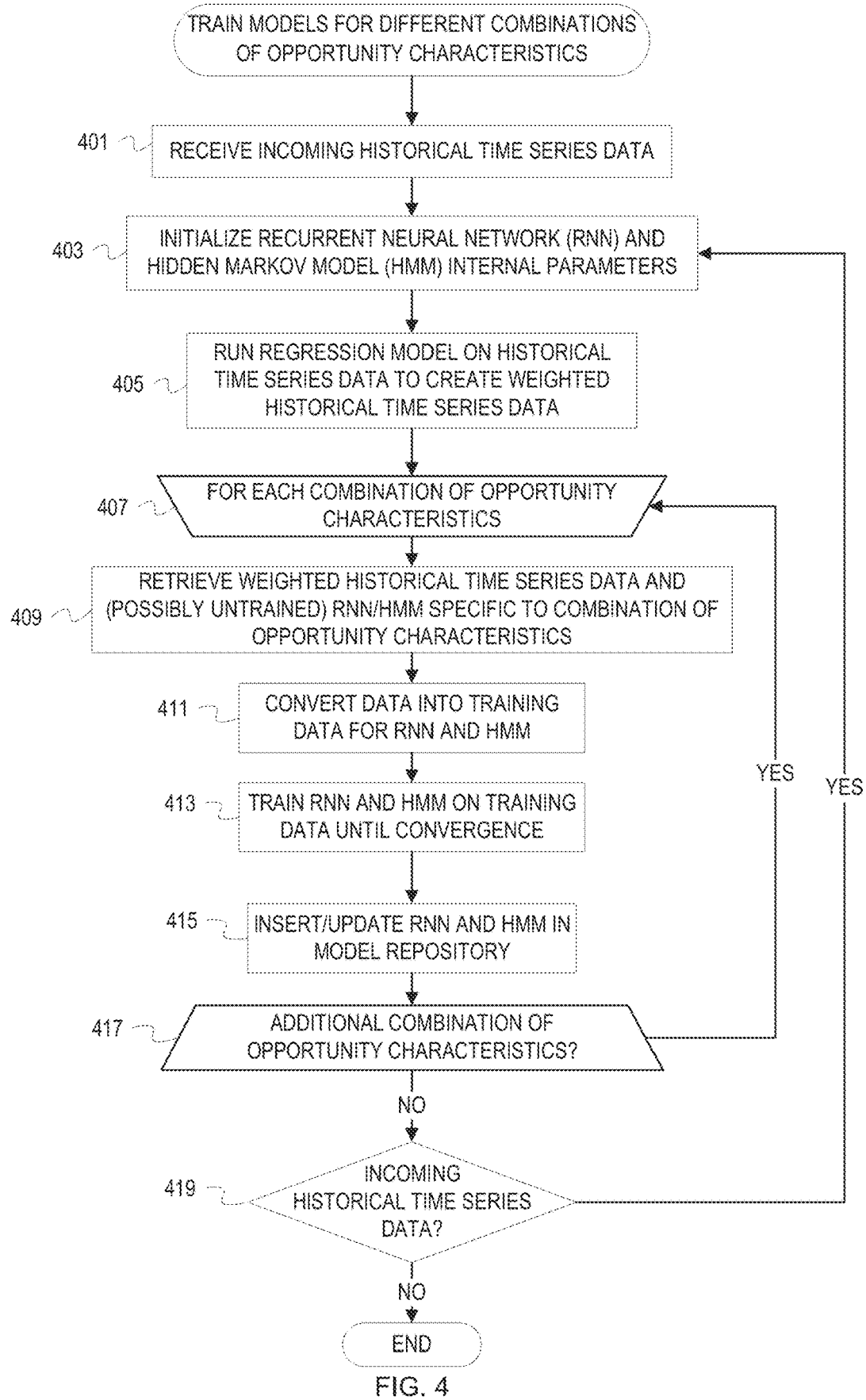
FIG. 4 is a flowchart of example operations for training RNNs and HMMs corresponding to different combinations of opportunity characteristics.

FIG. 4 is a flowchart of example operations for training RNNs and HMMs corresponding to different combinations of opportunity characteristics. The description of FIG. 4 refers to a "trainer" as performing the example operations. As previously mentioned, a program name can be arbitrary.

At block 401, the trainer receives incoming historical time series data comprising interactions from a data source. The data source can be a stream of data or a database that collects incoming data and stores it until set time intervals have expired. For example, a database can receive and store data, then the database can send a batch of currently stored data to update the models every week, month, quarter, etc.

At block 403, the trainer initializes untrained RNNs and untrained HMMs. The trainer can initialize the same number of untrained RNNs and HMMs as the number of possible combinations of opportunity characteristics. In other embodiments, the trainer can initialize untrained RNNs and HMMs based on combinations of opportunity characteristics from incoming historical time series data. For example, if historical time series data for account theater North America, account type Global, and product id 103 is received, and no RNN and HMM exists for this combination of opportunity characteristics, the trainer can initialize an untrained RNN and an untrained HMM for this combination of opportunity characteristics.

In typical embodiments, the trainer can choose initial internal parameters for the untrained RNNs randomly. The trainer can also choose the initial internal parameters based on previously trained models. The possible bias of such a choice of initial internal parameters should be considered. The trainer can initialize transition probabilities for the untrained HMMs to be uniformly at random between 0 and 1, or to be sampled according to a probability distribution that incorporates prior knowledge. Conversely, the trainer can initialize output probabilities in the untrained HMMs deterministically, based on the mean and variance of output values over all historical time series data corresponding to a given persona. For example, if the mean output value for persona j is 50 and the variance of the output values is 5, then the trainer can choose output probabilities from persona j such that the distribution of output values from persona j is approximately a normal distribution with mean 50 and variance 5. Such a distribution can be readily generated by someone of ordinary skill in the art by evaluating the cumulative distribution function of the normal distribution with mean 50 and variance 5 at the output values corresponding to output states.

At block 405 the trainer passes the incoming historical time series data into a regression model to determine weights for each historical time series datum comprising a single interaction. For instance, the trainer calls or invokes a regression model function from a package with the historical time series data as an input stream or a pointer to the location of the historical time series data. It will be computationally inefficient to compute a unique regression weight for every historical time series datum. In this case, unique weights can correspond to unique values of certain data attributes. For example, each channel of communication for an interaction can correspond to a specific weight. The target vector for the regression can be chosen to be the sale amount of each interaction, so that the weights are a measure of the contribution of each interaction or channel or other data attribute value to the resulting sale amount.

At block 407, the trainer begins iterating over combinations of opportunity characteristics. The trainer may iterate over only the combinations of opportunity characteristics present in the incoming weighted historical time series data. The loop of operations includes example operations 409, 411, 413, and 415.

At block 409, the trainer retrieves from the weighted historical time series data generated by running the regression model data corresponding to a given combination of opportunity characteristics. The trainer sends the combination of opportunity characteristics to a model repository, which either returns a trained or untrained RNN and HMM depending on whether weighted historical time series data corresponding to the combination of opportunity characteristics has been previously received. The trainer converts the weighted historical time series data corresponding to the given combination of opportunity characteristics into training data for the RNN and HMM at block 411. In some embodiments, the trainer can convert the data into training data in the manner described by data converter 1 213 and data converter 2 215.

At block 413, the trainer runs the RNN and HMM on batches of training data and after each batch, updates the internal parameters of the RNN and HMM based on the difference between model outputs and desired model outputs. Once the difference between model outputs and desired model outputs falls below a predetermined threshold, the training process has converged and training stops. If the RNN and HMM have been previously trained, the predetermined threshold can be large so that the additional training doesn't overfit the model to new data. The optimal value for the predetermined threshold is sensitive to the model architecture and statistics of the incoming weighted historical time series data. Once trained until convergence, the RNN is typically validated on the test data to ensure that training hasn't caused overfitting to the test data. This step can also inform future choices of predetermined threshold values. At block 415, once training has completed, the trainer reinserts the trained RNN and MEW into the model repository. The insertion can involve tagging or adding indexing information to allow for the trained RNN and HMM pair to be retrieved based on the combination of opportunity characteristics for which they were trained.

At block 417, the trainer determines whether there is an additional combination of opportunity characteristics in the weighted historical time series data. If there is another such combination, control returns to block 407. Otherwise, control continues to block 419.

At block 419, the trainer detects whether there is incoming historical time series data. If the trainer detects incoming historical time series data, control returns to block 403. Otherwise, training terminates.

Example Illustrations for Product Sequencing

As mentioned in the overview, a target engagement sequence of individuals to contact for an account/product pair can be used in combination with an account propensity model and a reinforcement learning model to identify an optimal sequence of individuals to contact for the account/product pair. FIGS. 5-8 provide example illustrations for determining a product sequence with highest likelihood of a conversion outcome. As with the target engagement sequence generator description, example illustrations for product sequencing being with illustrating use of trained models before illustrating training of the models.

Figure 5:
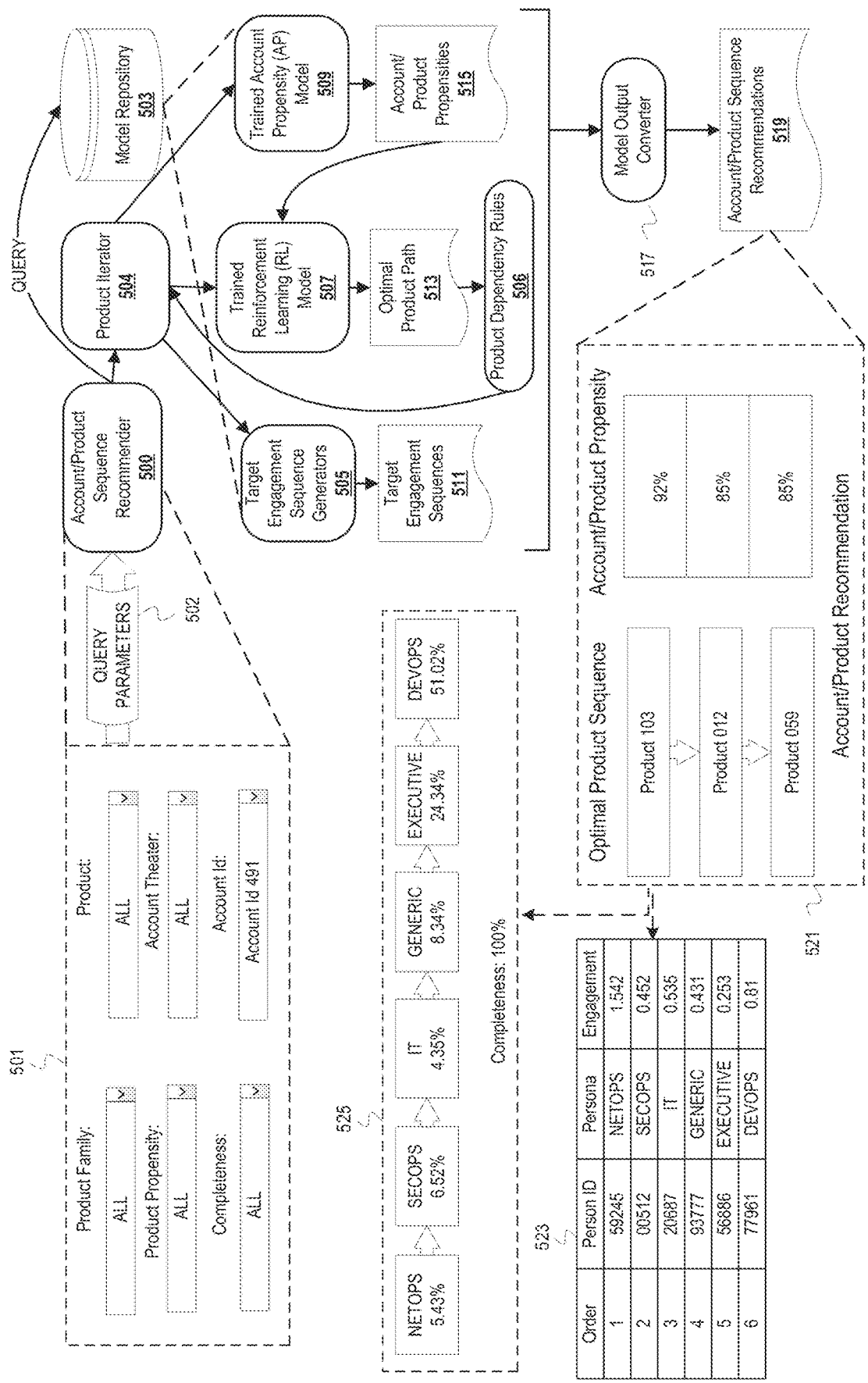
FIG. 5 is a conceptual diagram of an account/product sequence recommender responding to an account query specific to account features.

FIG. 5 is a conceptual diagram of an account/product sequence recommender responding to an account query specific to account features. Broadly, an account/product sequence recommender 500 receives query parameters 502 from a graphical user interface (GUI) 501, which may be a component of the account/product sequence recommender 500 or a separate program that passes the query parameters 502 via inter-process communication. The account/product sequence recommender 500 retrieves a trained reinforcement learning (RL) model 507, and a trained account propensity (AP) model 509 from model repository 503, based on the query parameters 502. A product iterator 504, based on query parameters 502, sends inputs to the trained AP model 509 which outputs account/product propensities 515. The product iterator 504 receives the account/product propensities 515 and provides inputs to the trained RL model 507 which outputs an optimal product path 513. The product iterator 504 receives the optimal product path 513 and retrieves target engagement sequence generators 505 from the model repository 503 based on the optimal product path 513 and the account/product propensities 515. The target engagement sequence generators 505 output target engagement sequences 511. The target engagement sequences 511, the optimal product path 513, and the account/product propensities 515 are combined by a model output converter 517 to create account/product sequence recommendations 519. Account/product recommendation 521 is an example of a possible output of the model output converter 517. Each product recommendation in the account/product recommendation 521 comprises a persona sequence 525 and an individual sequence and engagement table 523.

More specifically, the account/product sequence recommender 500 invokes the product iterator 504 and the trained AP model 509. The product iterator 504 can access a product information database (not pictured) and send product features from the product information database corresponding to every product combined with account characteristics from the query parameters 502 to the trained AP model 509. Examples of product features include a product type, a product age, a product price, etc. For each product, the trained AP model 509 outputs a propensity value that indicates the likelihood for the account to buy that product. The propensity value can be between 0 and 1 and can represent a probability value. The output of the trained AP model 509 is account/product propensities 515 comprising a set of tuples including the account id, the product id, and the propensity value computed by the trained AP model 509.

The account/product sequence recommender 500 invokes the trained RL model 507. The trained RL model 507 comprises a set of tuples, each tuple comprising a probability value, a state, and an action, as well as a Q function that takes a value for each state/action pair. There is a unique tuple corresponding to each state/action pair (i.e., a state/action pair has a single probability value in the set of tuples). The state corresponds to a product to sell. The action corresponds to a possible product to sell after selling the product corresponding to the state in the tuple. The probability value of each state/action pair is based on the value of the Q function at that state/action pair. It is noted that in the current embodiment, the set of actions and set of states is the same type of data—product identifier. The probability value is pretrained to give the likelihood to take an action given the current state according to a cumulative reward function.

The trained RL model 507 receives a product or products having a maximal account/product propensity value from the product iterator 504 and sets the received product as an initial state in the optimal product path 513. If multiple products have the same maximal account/product propensity value, the trained RL model 107 can create an optimal product path with initial states corresponding to each initial product (state) and choose the optimal product path 513 to be that which has the highest cumulative reward. The trained RL model 507 then chooses an action (product) given the current product as the action with highest Q function value of the state/action pairs with a state corresponding to the current product. This action is added to the optimal product path 513, and the current state is updated to correspond to the action. If the action with highest probability value corresponds to a product that is already in the optimal product path 513, the trained RL model 507 can choose an action with next highest probability value until it finds an action that is not already in the optimal product path. The trained RL model 507 chooses an action iteratively given the current state using the above methodology until a predetermined number of products has been chosen.

Once the trained RL model 507 constructs the optimal product path 513 in the aforementioned manner, it can validate the optimal product path 513 using a predetermined set of rules and/or constraints. The rules ensure that the optimal product path 513 does not contradict dependencies among products. For example, if product A is software and product B is a software package implementing product A, then the rule for a typical user is that product A must be sold before product B. A layer of business logic can define each rule by product or product subsequence. Every product will not necessarily have a corresponding rule to constrain its position in a product sequence. The product iterator 504 iterates through the products in the optimal product path 513 and evaluates the product against product dependency rules 506 to determine whether any of the rules are triggered for that product. If a rule is triggered, then the product iterator 504 evaluates the rule against the product based on its position within the optimal product path 513. For instance, the product may be product 059 and the rule is that product 059 must be sold after product 103 with an allowance for intervening products. Other rules may constrain a product to a particular adjacency. Yet other rules may create a list of products an account already owns and constrain the optimal product path to products on this list.

The product iterator 504, based on the validated optimal product path 513 and account/product propensities 515, retrieves target engagement sequence generators 505 from model repository 503. The product iterator 504 can choose products below a predetermined distance from the optimal product path 513 and above a predetermined threshold for the account/product propensity 515. The product iterator 504 then retrieves target engagement sequence generators 505 corresponding to the set of account/product pairs where the product is a product selected above by the product iterator 504 and the account corresponds to the account characteristics given by query parameters 502. The product iterator 504 then sends inputs to the target engagement sequence generators 505, which output target engagement sequences 511.

The model output converter 517, for each product in optimal product path 513, retrieves the account/product propensity from the account/product propensities 515 and aggregates them in the account/product recommendation 521. The account/product recommendation 521 has a first column displaying the optimal product sequence with arrows pointing to the next product in the sequence, and a second column displaying the corresponding account/product propensity for each product in the optimal product sequence. The account/product recommendation 521 further comprises the persona sequence 525 and the individual sequence and engagement table 523 that the model output converter 517 retrieves from the target engagement sequences 511. The outputs 523, 525 can be displayed below the account/product recommendation 521 or embedded as hyperlinks therein.

Figure 6:
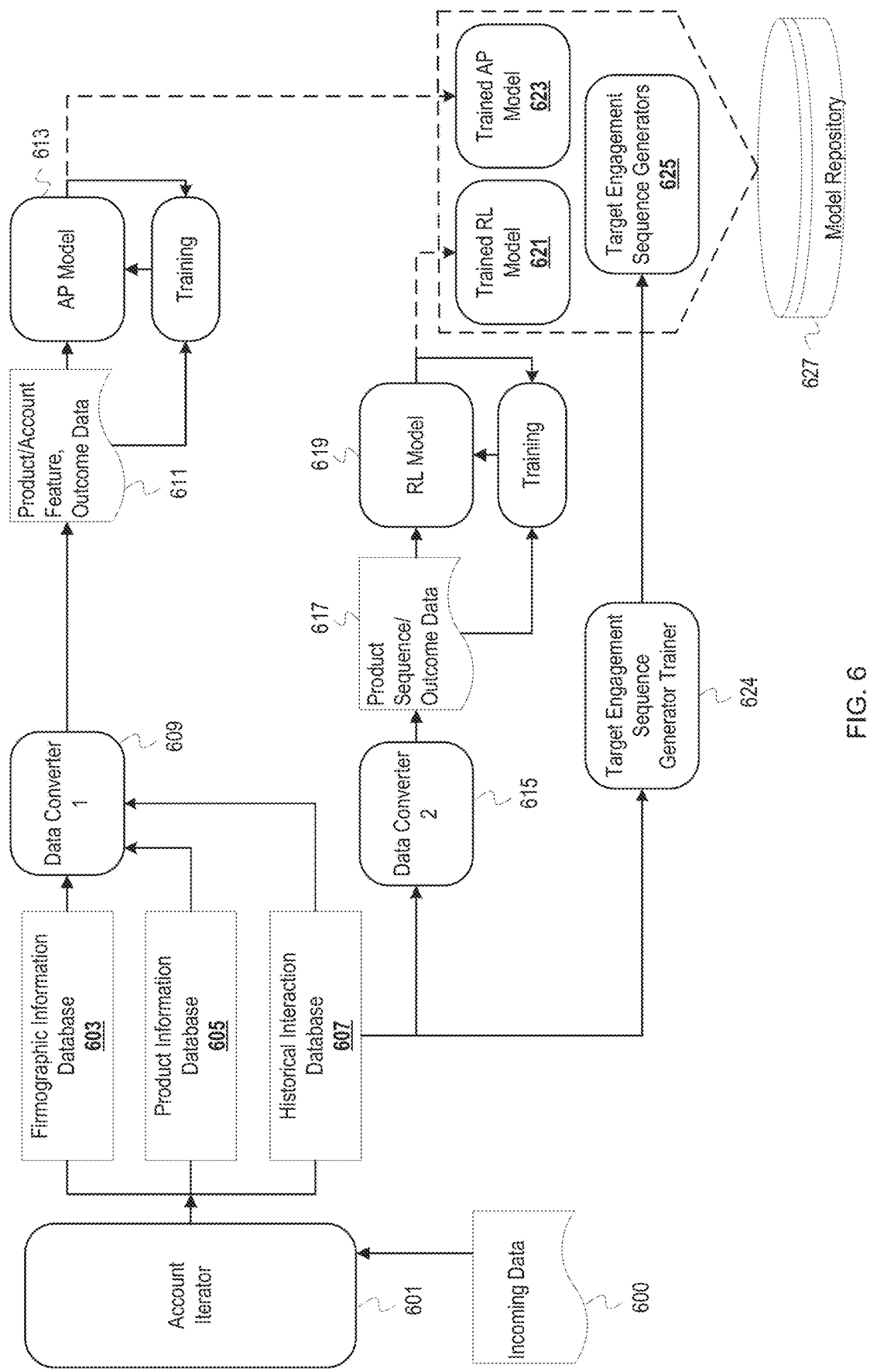
FIG. 6 depicts training for an account/product sequence recommender.

FIG. 6 depicts training for an account/product recommender. In broad terms, an account iterator 601 feeds batches of incoming data 600 corresponding to accounts through several databases and eventually to data converter 1 609, data converter 2 615, and target engagement sequence generator trainer 624. Data converter 1 609 and data converter 2 615 convert the received data into inputs for AP model 613 and RL model 619. The databases 603, 605, and 607 also perform various updates (or are updated) based on the incoming data 600. After training has terminated, the model repository 627 stores a trained RL model 621, a trained AP model 623 and target engagement sequence generators 625.

The account iterator 601, based on receiving the incoming data 600, sends account characteristics and incoming data 600 to a firmographic information database 603, a product information database 605, and a historical interaction database 607. The account characteristics comprise characteristics of every account represented in the incoming data 600. Account characteristics can include an account identifier (id), account theater, account type, account size, etc. The incoming data 600 can comprise firmographic data, product data, or historical time series data. Firmographic data can indicate account characteristics including account ownership, account age, account financial features, account technology type, etc. Product data can indicate a product type, a product age, other products that must be sold before or after a product, etc. Examples of historical time series data is depicted in FIG. 2.

At each iteration of account iterator 601, the data converter 1 609 receives incoming firmographic, product, and interaction data corresponding to an account from databases 603, 605, 607, and outputs vectors illustrated in aggregate as product/account feature, outcome data 611 which can be fed into AP model 613. The product/account feature, outcome data 611 comprises an account characteristics vector and a product classification vector. Data converter 1 609 receives the firmographic data indicating account characteristics and converts the categorical data attributes into numerical data attributes, creating the account characteristics vector. Data converter 1 609 receives product data that indicates features for each product and converts the features into numerical features to create the product classification vector. Data converter 1 609 additionally receives historical interaction data for historical won/lost opportunities. Data converter 1 609 groups the historical interaction data by product id and prunes data attributes from the historical interaction data except the data attributes product id and outcome. For each product, data converter 1 609 creates a product/account outcome feature vector ("outcome vector") by concatenating the account characteristics vector, the product classification vector, and the outcome data attribute(s) corresponding to the product id of the current product. Product/account feature, outcome data 611 comprises the product/account outcome feature vectors for every product indicated in the incoming data 600.

The AP model 613 receives product/account feature, outcome data 611. The AP model 613 is a propensity model, and as such can use logistic regression, gradient boosting, etc. to calculate propensity values. The AP model 613 in the currently described embodiment is a random forest comprising a plurality of random trees. The random trees are initially empty trees, with no nodes or leaves. The AP model 613 samples a set of N outcome vectors from the product/account feature, outcome data 611 and grows a random tree according to the randomly sampled set of outcome vectors. The AP model 613 splits the outcome vectors into product/account feature vectors of length p and an outcome vector of length N. Nodes in the random trees correspond to a product/account feature and a splitting value. Thus, each node splits the space of product/account features according to whether the value of the product/account feature is above or below the splitting value.

For each random tree, the AP model 613 initializes the random tree by choosing m features uniformly at random from the p total account/product features, and determining, according to a loss function applied to the sampled product/account feature vectors and outcome vector, which of the m features is optimal for splitting, and the optimal splitting value. Based on the value of the loss function, the node will subdivide the account/product feature space into account/product features that have a likelihood above some value, and a likelihood below some value. From each node, the AP model 613 creates two daughter nodes and the above process is applied recursively until a desired tree depth is reached. Embodiments can set the value of m to be no greater than $\sqrt{p}$. The AP model 613 samples additional sets of N outcome vectors from the product/account feature, outcome data 611 and trains an additional random tree until a desired number of random trees is reached. If the random forest has been previously trained when the AP model 613 receives product/account feature, outcome data 611, the incoming data can be used to update the nodes of each random tree in the random forest as well as the likelihood values at the leaves of each random tree.

At each iteration of account iterator 601, data converter 2 615 receives historical interaction data from historical interaction database 607 corresponding to an account. The data converter 2 615 can group the historical interaction data by product, and for each account can prune the attributes of the historical interaction data except the product id attribute, the outcome attribute, and the time attribute. The data converter 2 615 can then order the product id/outcome/time data by time data attribute, and then prune the time data attribute. The product sequence/outcome data 617 comprises the ordered product id and outcome data.

At each iteration of account iterator 601, the RL model 619 receives the product sequence/outcome data 617 of the particular iteration. The RL model 619 is initialized with random or deterministic Q function values. The Q function values can all be initialized to zero or can be generated from a probability distribution. In some embodiments, the Q function values are initialized to high values to encourage the RL model 619 to explore many potential actions from a given state. The first observed reward can be used to reset the initial Q function values. The choice of Q function initialization can vary significantly depending on the structure of the training data. The RL model 619 updates the Q function value at each state/action pair represented by consecutive products in the product sequence/outcome data 617 according to the outcome, using an iteration update that includes an estimate of future rewards. The discount factor of the future reward can be small, such that future rewards are not overvalued compared to current rewards. If the RL model 619 is already initialized, the product sequence/outcome data 617 is used to update the Q function values for each state/action pair.

In this example illustration, the Q function is trained via an iterative update as it receives sequences of products and corresponding outcomes. The Q function can instead be a deep artificial neural network (DANN). Instead of an iterative update, the DANN uses the difference between a current reward (i.e. Q function value) and future reward once an action is taken to backpropagate. This enables the use of product classifications in the training sequences for the RL model 619 and also allows the RL model 619 to subsample random batches of data for training at each epoch. This can reduce the variance of training and can reduce the temporal correlations found in sequence training data. Moreover, the architecture of the DANN can be tuned according to the statistics of the incoming data.

Target engagement sequence generator trainer 624 receives or retrieves data from the historical interaction database 607 and uses it for training the target engagement sequence generators 625 as described in FIG. 2. This received/retrieved data can be different instances of the incoming data 600 that is organized and stored into the historical interaction database 607. Once training has completed, trained RL model 621, trained AP model 623, and target engagement sequence generators 625 are stored or updated in model repository 627.

Figure 7:
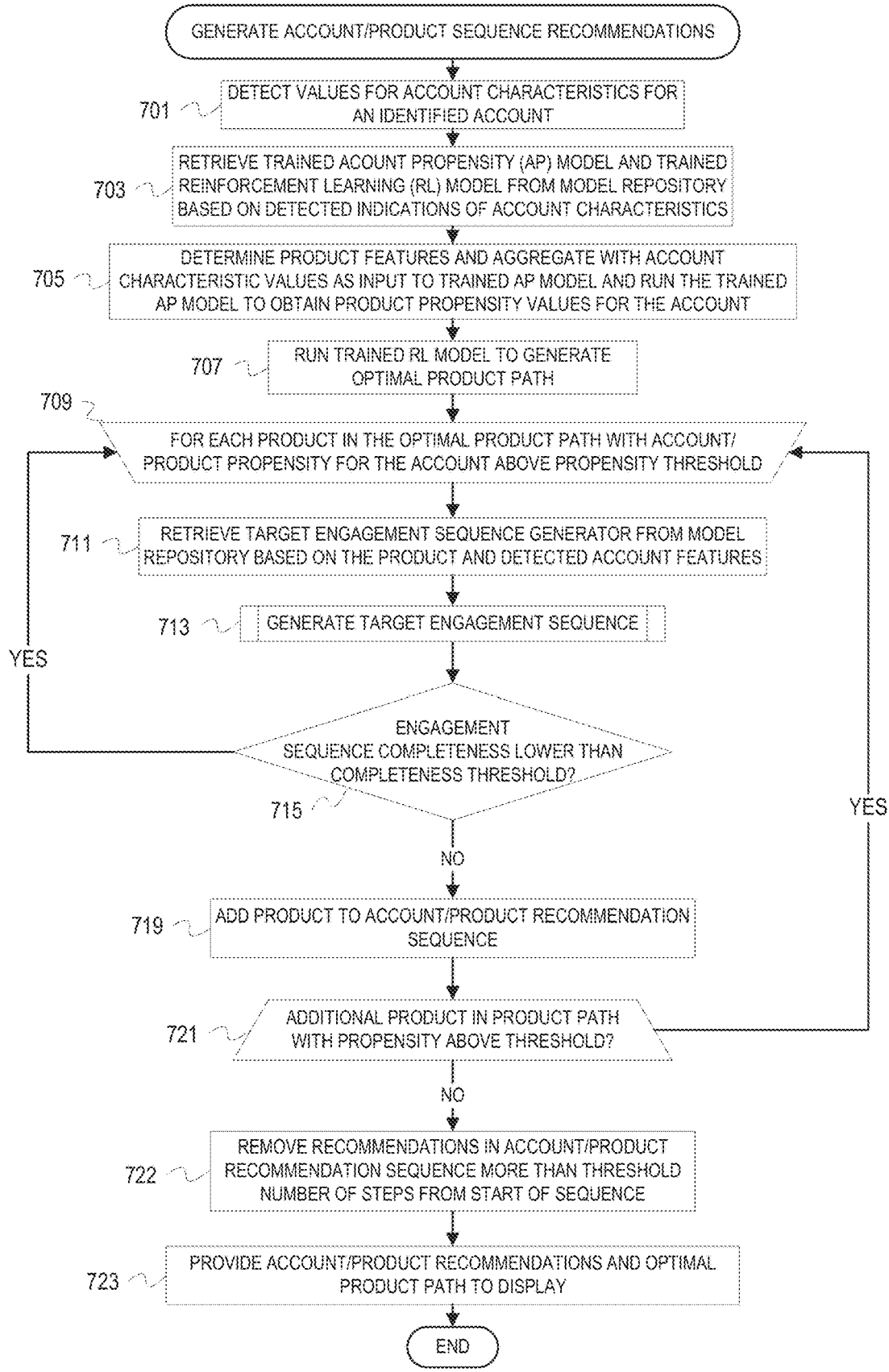
FIG. 7 is a flowchart of example operations for generating an account/product sequence recommender based on a trained AP model, a trained RL model, and target engagement sequence generators.

FIG. 7 is a flowchart of example operations for generating account/product sequence recommendations. The description of FIG. 7 refers to an account/product sequence recommender, hereinafter a "recommender," as performing the example operations. As previously mentioned, a program name can be arbitrary.

At block 701, the recommender detects values for account characteristics (detected values) corresponding to an identified account. Account characteristics can include an account theater, account id, account type, account size, etc. An account can have different values for a same account characteristic. For instance, a company can have a presence in multiple theaters (e.g., North America and Asia). One or multiple of these values would be specified or chosen for the account theater characteristic when using the recommender. For instance, a GUI can include multiple dropdown menus for account characteristics with a listing of values for each account feature. One of these values may represent all possible values for the account characteristic. In addition, an account can be associated with sub-accounts. Thus, a GUI or other interface may allow for obtaining a recommendation across all sub-accounts or for a subset of the sub-accounts of an account. The recommender can detect values for or indications of account characteristics using a variety of mechanisms, examples of which include via GUI, receipt of a query via a communications protocol or procedure call, based on monitoring a database of account assignments, etc.

At block 703, the recommender identifies a trained AP model from a plurality of trained AP models and identifies a trained RL model from a plurality of trained RL models. This identification is done based on the detected account characteristic values. Identifying a trained model can be submitting a query to a model repository based on the detected account characteristic values to retrieve the trained models. The recommender queries or searches the model repository indexed with the detected account characteristics to retrieve a trained RL model that has been trained on data specific to the account characteristics. The recommender can retrieve the trained AP model based on a more general query or search because the trained AP model can correspond to multiple combinations of account characteristics. For example, trained AP model can be trained on data specific to all combinations of account characteristics, so that it achieves a lower validation error by training on a large data set.

At block 705, the recommender determines product features and aggregates the products feature with the account characteristic values as inputs for the trained AP model. The recommender can retrieve feature vectors for all products that can be offered by a source (e.g., software security company) to the account corresponding to the account characteristic values. However, the recommender can retrieve feature vectors for a subset of the products offered based on the account characteristic values. As examples, the recommender can limit candidate products based on business sector of the account, size of the account, etc. After determining the relevant products, the recommender retrieves (e.g., accesses a database) to obtain the feature vectors of the relevant products. Each input comprises feature based classifications about each candidate product aggregated with the detected account characteristics, and such inputs are generated for every product. The recommender then invokes the trained AP model on the generated inputs. The trained AP model outputs a propensity value for each product corresponding to the likelihood the account corresponding to the detected account characteristics will buy that product.

At block 707, the recommender invokes the trained RL model using product classifications for the product with maximal propensity value. The recommender identifies which product in the output from the trained AP model has a maximal propensity value and feeds a corresponding product identifier into the trained RL model to obtain a product path corresponding to the product with highest propensity value. If the trained AP model output indicates multiple products with a same, highest propensity value, then the recommender invokes the trained RL model for each of these products. The trained RL model generates an optimal product path comprising a sequence of products aggregated with classifications for each product in the sequence.

At block 709, the recommender begins iterating over the products in the product path with a propensity value computed at block 705 above a propensity threshold. The choice of propensity threshold is predetermined and can be based on the desired proportion of products to prune using the trained AP model. Pruning too many products risks introducing bias from the trained AP model in the selected product and pruning too few products risks allowing unlikely account/product recommendations. The example operations depicted in blocks 711, 713, 715, 717 and 719 comprise further operations to prune products that the account corresponding to the detected account characteristics is unlikely to buy.

At block 711, the recommender retrieves a target engagement sequence generator from the model repository based on the product and account. The recommender can query or search the model repository based on product classifications and account characteristics.

At block 713, the recommender invokes the target engagement sequence generator to generate a target engagement sequence. Example operations to generate a target engagement sequence are depicted in FIG. 3.

At block 715, the recommender determines whether an engagement sequence completeness is lower than a completeness threshold. The engagement sequence completeness is computed as the percentage of personas in the target engagement sequence generated at block 713 that have individual metadata and relative importance values. A target engagement sequence can fail to be 100 percent complete if no incoming data relevant to a given persona and the account/product combination has been received within a fixed time horizon. If the engagement sequence completeness is lower than the completeness threshold, control returns to block 709. Otherwise, control continues to block 717.

At block 719, the recommender adds the product to account/product recommendations. The account/product recommendations comprise a set of products and corresponding product classifications, the target engagement sequence for each product, and the detected account characteristics. The account/product recommendations are in a sequence corresponding to when they were created. At block 721, the recommender determines whether there is an additional product in the product path produced by the trained RL model. If there is another such product, control returns to block 709. Otherwise, control continues to block 722.

At block 722, the recommender prunes each recommendation in the sequence of account/product recommendations more than a threshold number of steps from the start of the sequence, where the threshold number of steps is a desired length of the sequence of recommendations. Hence, when there are more recommendations than number of steps, the account/product recommendation sequence will be pruned to have a number of recommendations equal to the number of steps. Choosing from the start of the account/product sequence ensure the likelihood of success for that recommendation is high, since the recommendations were created in order according to the optimal product path. As previously described, the recommender determines the threshold number of steps low enough to prune products that would result in unlikely account/product recommendations and high enough to avoid a bias in the selected products based on the output of the trained RL model.

At block 723, the recommender sends the account/product recommendations and optimal product path to a display that can comprise a GUI. The recommender can prune the products on the optimal product path such that only products contained in the account/product recommendations are sent to the display.

Figure 8:
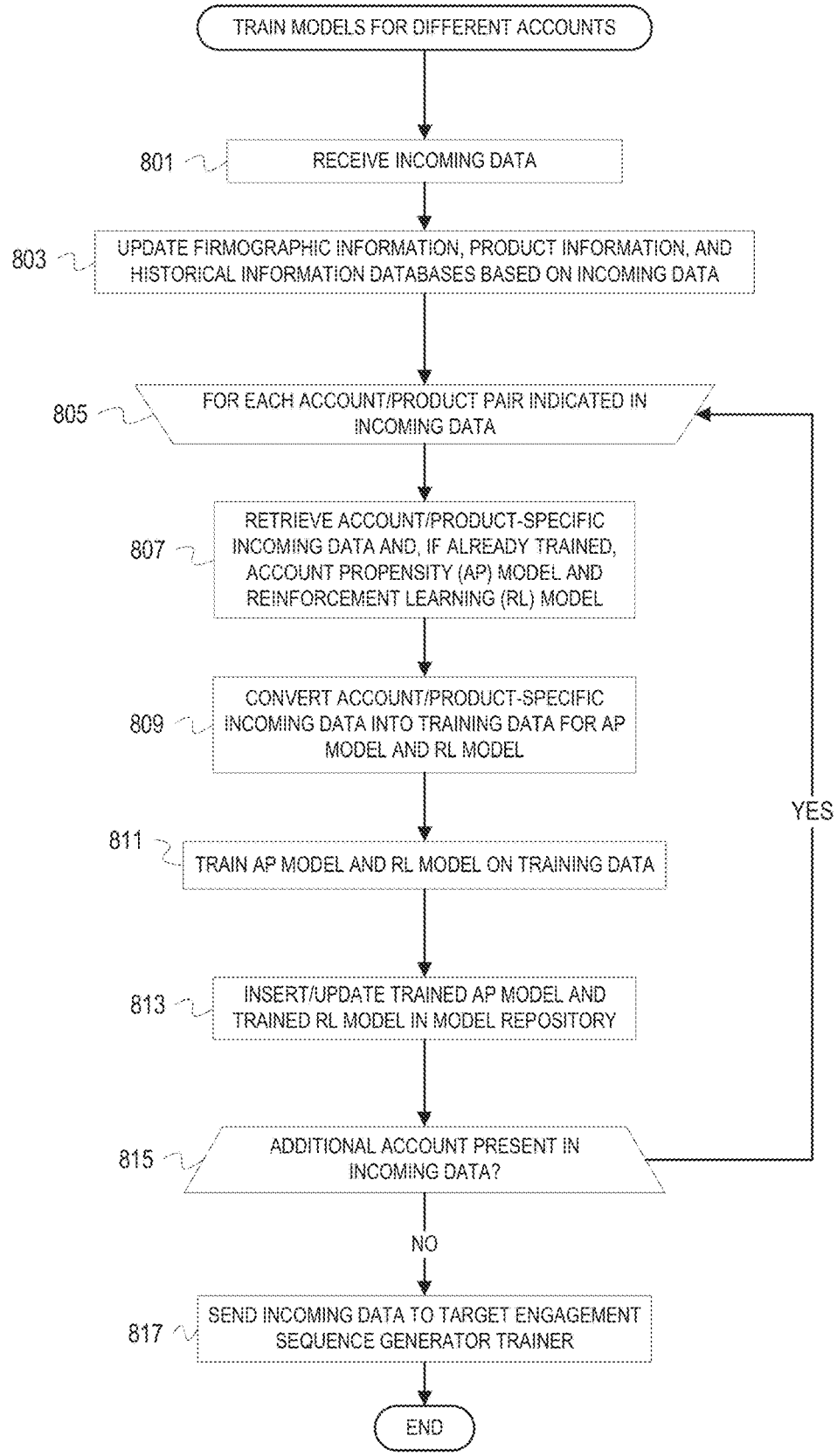
FIG. 8 is a flowchart of example operations for training an AP model and RL models corresponding to different accounts.

FIG. 8 is a flowchart of example operations for training AP and RL models corresponding to different combinations of account characteristics. The description of FIG. 8 refers to a "trainer" as performing the example operations. As previously mentioned, a program name can be arbitrary.

At block 801, the trainer receives incoming data. The incoming data can include product characteristics, account characteristics, and historical interaction data. The incoming data can be from multiple data sources such as company sales records, a customer relationship management system, and third-party data sources with external records.

At block 803, the trainer updates the firmographic information, product information, and historical information databases based on the incoming data. As previously described, the databases can hold batches of incoming data for specified time intervals before distributing the batches to the models for training. The time intervals can vary depending on which model is being trained, the amount of data received, etc. For example, batches of data can be sent to the AP model for training more frequently so that potential opportunities can be detected more quickly.

At block 805, the trainer begins iterating through account/product pairs indicated in the incoming data. Different data sources can indicate an account and a product in the account/product pairs. The trainer can create a list of every account and every product indicated in the incoming data and iterate through the possible pairings of account and product. When the incoming data corresponding to an account/product pair is insufficient to train the models, the trainer can omit this account/product pair in the iteration. The trainer can sort the incoming data by account characteristics and product classifications. The trainer can store pointers for each account/product pair to the incoming data. Example operations 807, 809, 811, and 813 comprise operations for generating training data for each account/product pair and training the AP and RL models corresponding to the account/product pair.

At block 807, the trainer retrieves the account/product specific data. If models have already been trained for the account/product pair, then the trainer also retrieves the AP model and RL model specific to the account/product pair from a model repository. The trainer can search for account characteristics and product classifications corresponding to the account/product pair in the incoming data. The trainer can retrieve the account/product specific data that has been presorted in block 805, or it can follow a pointer created in block 805 to retrieve the account/product specific data in the incoming data. To retrieve the models, the trainer queries the model repository with account characteristics and product classifications corresponding to the account/product pair at the current iteration. In response, the model database performs a search based on the received account characteristics and product classifications and returns an AP model and a RL model. If there is no AP model or RL model corresponding to the account characteristics and product classifications, the model repository can return a null value or indication that the AP model or RL model has not been instantiated. In response to receiving a null value or indication, the trainer can instantiate the AP model or the RL model. The AP model is instantiated as an empty forest with no initial parameters. The RL model is instantiated with Q function values corresponding to each action/state pair that can be deterministic or random.

Embodiments may train a single AP model across all accounts to prevent underfitting. Thus, when the trainer queries the model repository at block 807, it can send a request for an AP model instead of account characteristics and product classification.

At block 809, the trainer converts the account/product specific incoming data into training data for the AP model and RL model. Training data for the AP model comprises vectors of aggregated account characteristics, product classification, and outcome values. The outcome values indicate, from the historical interaction data, whether a winning/intended or losing/unintended outcome was achieved from selling the product to the account. For example, a training datum for the AP model can comprise an account id 103, an account theater North America, an account size large, a product id 198, a product type cloud, and an outcome value 1. The outcome value 1 indicates a winning outcome. The trainer can convert categorical features in this datum to numerical features before training. Training data for the RL model comprises sequences of product identifiers for products sold to the account as well as for each product in each sequence a value corresponding to the sale amount of the product to the account. For example, a training datum for the RL model can comprise a product id 103 with sale amount 3000, a product id 312 with sale amount 10000, and a product id 293 with sale amount 0.

At block 811, the trainer trains the AP model and the RL model on the training data. In some embodiments where the AP model is a random forest model, the trainer creates random subsamples of the AP model training data, and each random subsample is used to train a separate random decision tree in the random forest model. The training data for the RL model comprising sequences of product identifiers with sale amounts is fed, one sequence after another, into the RL model. Specifically, the reward observed by the RL model at each state (product id) corresponds to the sale amount for that product id in the sequence. The RL model is trained until the Q function converges or all the training data has been used.

Once trained, at block 813 the trainer inserts or updates the trained RL model and trained AP model in the model repository. The trainer then determines at block 815 whether there is additional incoming data that can be used for training the models. If there is additional incoming data, then control returns to block 805. If there is no additional incoming data, then control flows to blocks 817.

At block 817, the trainer sends incoming data to the target engagement sequence generator trainer. The trainer can send the historical interaction data present in the incoming data, since this is the data used to train the target engagement sequence generators.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in FIG. 7 can be performed to run the trained RL model to generate the optimal product path before generating propensity values using the trained AP model. In another example, in FIG. 8 the account/product sequence recommender can convert all the incoming data into training data for the AP model and train the AP model on all the training data at once. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 9:
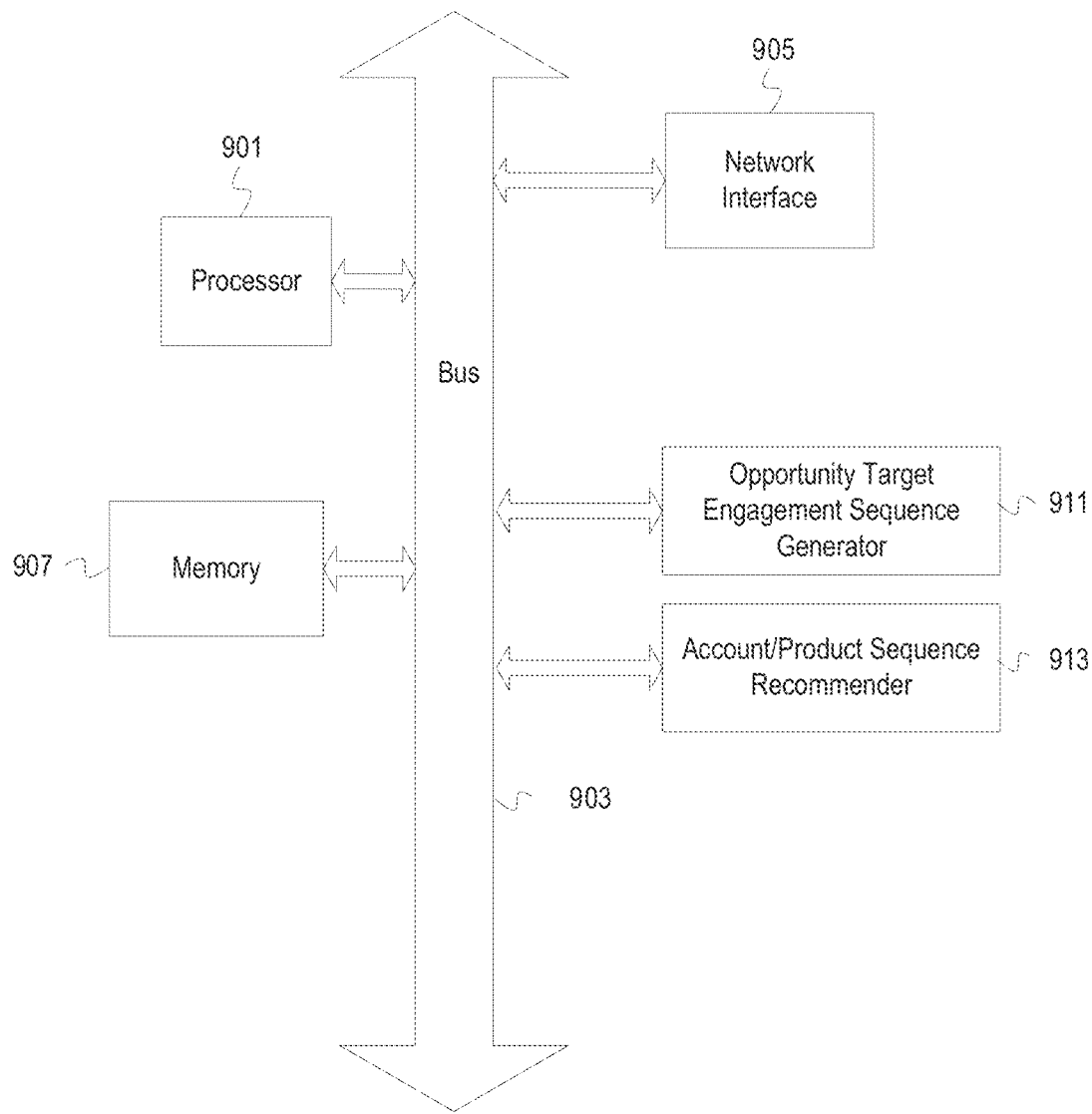
FIG. 9 depicts an example computer system with an opportunity target sequence generator and an account/product sequence recommender.

FIG. 9 depicts an example depicts an example computer system with an opportunity target engagement sequence generator and an account/product sequence recommender. The computer system includes a processor 901 (possibly including multiple processors, multiple cores, multiple nodes, and/or implementing multi-threading, etc.). The computer system includes memory 907 or any one or more of the above already described possible realizations of machine-readable media. The computer system also includes a bus 903 and a network interface 905 (e.g., a wireless interface, wired interface, etc.). The system also includes an opportunity target engagement sequence generator 911. The opportunity target engagement sequence generator 911 uses a trained RNN and a trained HMM that have been trained for a particular combination of opportunity characteristics values to identify a sequence of individuals from identified personas with a highest likelihood of realizing an opportunity. The system also includes an account/product sequence recommender 913. The account/product sequence recommender 913 ("recommender") uses a trained RL model and a trained AP model to identify a sequence of product engagement ("product path") with a highest likelihood of achieving an intended outcome for an account/product pair. The recommender 913 can present a GUI that allows indication of a product or product classification and an account. Data representing this pairing is used to select a trained RL model and a trained AP model. The trained AP model is run for the account/product pair to obtain propensity values. The trained RL model is also run for the account/product pair to obtain an optimal product path for the indicated product. The product path is then pruned based on the propensity values to obtain a product sequence. The target engagement sequence generator 911 is then used for each product in the product path to determine a target engagement sequence for each product for the account. Any one of the previously described functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

While the aspects of the disclosure are described with reference to various implementations and exploitations, it will be understood that these aspects are illustrative and that the scope of the claims is not limited to them. In general, techniques for multi-model based identification of an optimal sequence of targets to engage to realize an opportunity and for multi-model based recommendation of account/product sequences to create an opportunity as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
    generating a first plurality of product propensity values with a trained propensity model that has been trained with first training data corresponding to a first account, wherein the first plurality of product propensity values generated for a first plurality of product identifiers;
    generating a first product path with a trained reinforcement learning model, wherein the first product path comprises a second plurality of product identifiers and wherein the trained reinforcement learning model was trained with the first training data and wherein the first plurality of product identifiers includes the second plurality of product identifiers;
    determining that a first subset of the first plurality of product propensity values satisfies a propensity threshold for the first account;
    identifying a first subset of the second plurality of product identifiers that corresponds to the first subset of product propensity values; and
    indicating the first subset of the second plurality of product identifiers in a sequence according to the first product path.

2. The method of claim 1 further comprising:
    detecting account characteristic values corresponding to the first account; and
    selecting the trained propensity model from a plurality of trained propensity models and the trained reinforcement learning model from a plurality of trained reinforcement learning models, based, at least in part, on the detected account characteristic values.

3. The method of claim 2, wherein each of the plurality of trained propensity models and each of the plurality of trained reinforcement learning models were trained with data corresponding to different accounts.

4. The method of claim 1 further comprising determining, for each product identifier in the first subset of the second plurality of product identifiers, a sequence of contacts to engage about a product identified by the product identifier.

5. The method of claim 4, wherein determining, for each product identifier in the first subset of the second plurality of product identifiers, a sequence of contacts to engage comprises:
    for each product identifier in the first subset of the second plurality of product identifiers, retrieving a trained artificial recurrent neural network from a plurality of artificial recurrent neural networks based, at least in part, on product characteristic values of a product identified by the product identifier and account characteristic values for the first account;
    generating a sequence of organizational classifications with each of the retrieved artificial recurrent neural networks; and
    identifying a contact for each of the sequence organizational classifications.

6. The method of claim 5 further comprising determining that each of the first subset of the second plurality of product identifiers corresponds to a sequence of organizational classifications with a sequence completeness above a threshold sequence completeness value.

7. The method of claim 1 further comprising determining that each of the first subset of the second plurality of product identifiers is within a threshold distance of the first product path.

8. The method of claim 1, wherein the trained propensity model is a random forest based model.

9. The method of claim 1, wherein the trained reinforcement learning model is trained with Q-learning.

10. A non-transitory, machine-readable medium having program code stored thereon that is executable by a machine, the program code comprising instructions to:
    invoke a first trained propensity model to generate a first plurality of propensity values for a first plurality of products a first account;
    invoke a first trained reinforcement learning model to generate a first product path for a first product of the first plurality of products that corresponds to a maximal of the first plurality of propensity values, wherein the first product path identifies a first set of products from the first plurality of products in a particular order to present to the first account for a highest likelihood of a successful outcome for the first product; and
    associate contacts of the first account for at least a first subset of the first set of products.

11. The non-transitory, machine-readable medium of claim 10, wherein the program code further comprises instructions to prune the first product path based, at least in part, on a propensity threshold.

12. The non-transitory, machine-readable medium of claim 11, wherein the instructions to associate contacts comprise instructions to associate contacts of the first account for those of the first set of products remaining after the pruning.

13. The non-transitory, machine-readable medium of claim 11, wherein the propensity threshold corresponds to the first account.

14. The non-transitory, machine-readable medium of claim 10, wherein the instructions to invoke the first trained propensity model comprise instructions to invoke the first trained propensity model with first input comprising characteristics of the first account and product features of the first plurality of products.

15. The non-transitory, machine-readable medium of claim 10, wherein the program code comprises instructions to:
    invoke a second trained reinforcement learning model to generate a second product path for a second product of the first plurality of products that corresponds to the maximal or a second maximal of the first plurality of propensity values, wherein the second product path identifies a second set from the first plurality of products in a particular order to present to the first account for a highest likelihood of a successful outcome for the second product; and
    associate contacts of the first account for at least a first subset of the second set of the first plurality of products.

16. The non-transitory, machine-readable medium of claim 10, wherein the program code further comprises instructions to:

for each product of at least the first subset of the first set of the first plurality of products, generate a sequence of organizational classifications with a trained artificial recurrent neural network retrieved based, at least in part, on the first product, wherein the contacts are determined from the sequence of organizational classifications.

17. An apparatus comprising:

a processor; and a machine-readable medium having instructions stored thereon that are executable by the processor to cause the apparatus to, detect account characteristic values corresponding to a first account;

retrieve a trained propensity model from a plurality of trained propensity models and a trained reinforcement learning model from a plurality of trained reinforcement learning models, based, at least in part, on the detected account characteristic values;

generate a first plurality of product propensity values with the trained propensity model based, at least in part, on the detected account characteristic values and product features of a first plurality of products;

generate a first product path for a first product of the first plurality of products with the trained reinforcement learning model, wherein the first product corresponds to a maximal one of the first plurality of product propensity values and the first product path identifies a first set of products of the first plurality of products including the first product;

prune the first product path based on a propensity threshold for the first account and those of the first plurality of product propensity values corresponding to the first set of products; and indicate the pruned first product path.

18. The apparatus of claim 17, wherein the machine-readable medium further comprises instructions executable by the processor to cause the apparatus to:

determine, for each product identified in the pruned first product path, a sequence of contacts to engage about the product.

19. The apparatus of claim 18, wherein the instructions to determine, for each product identified in the pruned first product path, a sequence of contacts to engage comprise instructions to:

for each product identified in the pruned first product path, retrieve a trained artificial recurrent neural network from a plurality of artificial recurrent neural networks based, at least in part, on product characteristic values of the identified product and account characteristic values for the first account;

generate a sequence of organizational classifications with each of the retrieved artificial recurrent neural networks; and identify a contact for each of the sequence of organizational classifications.

20. The apparatus of claim 17, wherein the machine-readable medium further comprises instructions executable by the processor to cause the apparatus to:

determine whether each of the first set of products is within a threshold distance of the first product path.

* * * * *